March 9, 1943.   W. B. JONES   2,313,345
THERMAL INSULATION
Filed Dec. 14, 1939
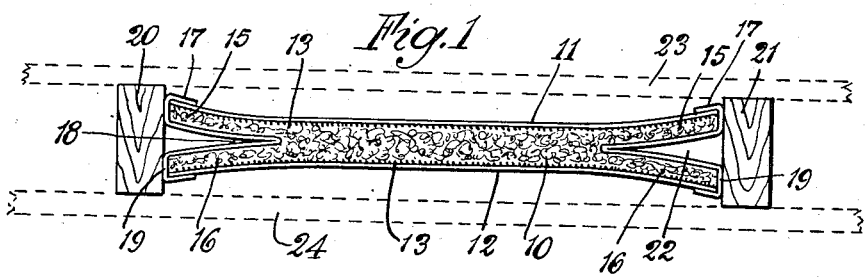
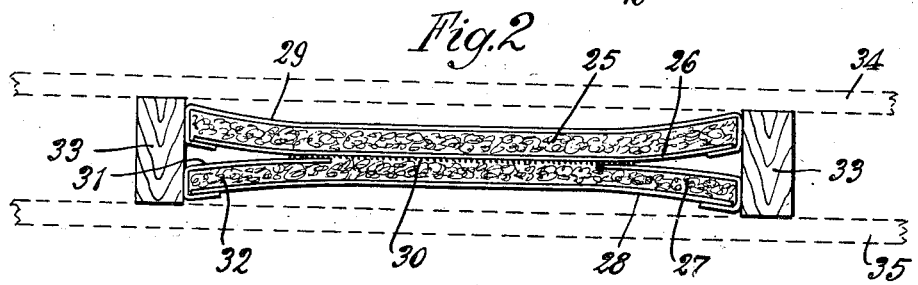
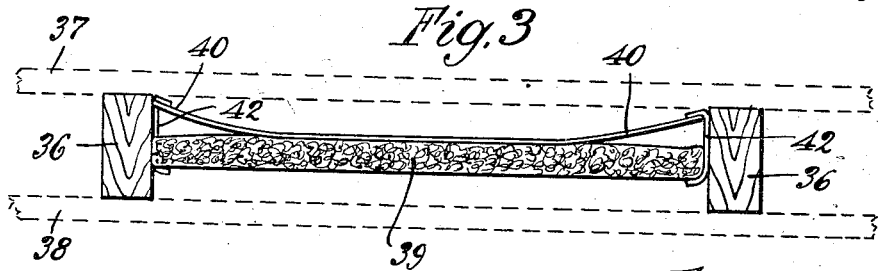
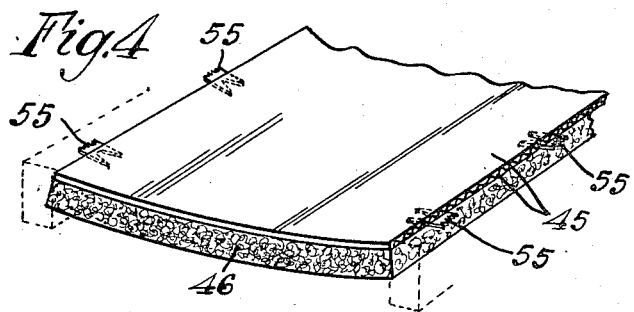
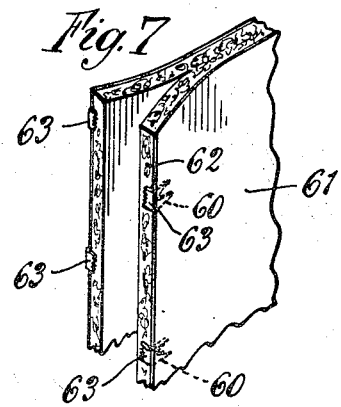
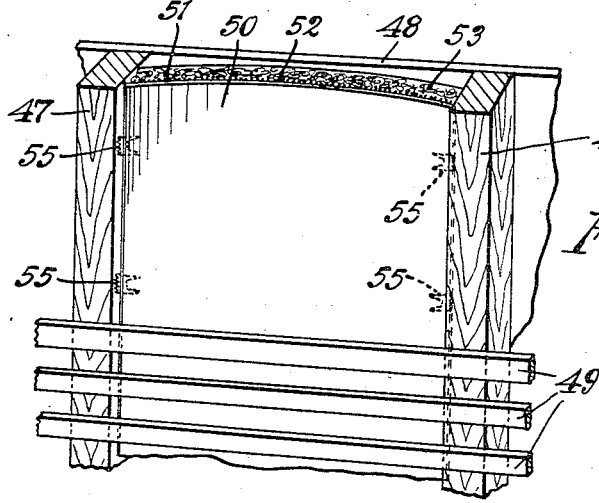
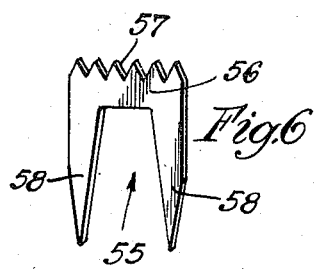
INVENTOR.
W. Bartlett Jones, Patented Mar. 9, 1943

2,313,345

UNITED STATES PATENT OFFICE 2,313,345

THERMAL INSULATION

W Bartlett Jones, Chicago, Ill., assignor to Wood Conversion Company, Cloquet, Minn., a corporation of Delaware Application December 14, 1939, Serial No. 309,165

8 Claims. (Cl. 20—4)

The present invention relates generally to thermal insulation, and more particularly to rigid bats or strips, and flexible bats or strips, of thermal insulation for insertion into recesses, such as the spaces between studs or rafters.

Heretofore, insulation of this sort has been provided with mounting extensions, such as flanges, by which it is readily secured to the sides of studs or rafters, or the faces thereof, or to both. Considerable expense in manufacture is involved to provide such mounting means. Additionally, considerable time is required to mount the flanges.

The present invention aims to provide insulation which has a structure permitting it to be forced into position to remain mounted between spaced supports.

Various other and ancillary objects and advantages of the invention will be apparent from the following description and explanation of the invention, given herein with reference to the accompanying drawing in which:

Fig. 1 shows a cross-section across a wall space carrying split-edge insulation.

Fig. 2 is a horizontal sectional view through a vertical wall space in which a modified form of the invention is embodied.

Fig. 3 is a horizontal sectional view through a vertical wall space in which another modified form of the invention is embodied.

Fig. 4 is a perspective view of a form of the insulation having a corrugated board facing, and toothed means carried thereby.

Fig. 5 is a perspective fragmentary view of a vertical wall structure showing the end in cross-section in which the insulation of Fig. 4 is mounted.

Fig. 6 is a perspective view of a metal device with teeth.

Fig. 7 is a perspective fragmentary view of a body insulation having a longitudinally split edge into the wings of which toothed means are mounted.

The invention may be carried out simply in a form as shown in Fig. 1. The numeral 10 represents a mass or body of insulation, such as a felted fiber. It may be flexible or rigid, using such terms loosely and consistently with the invention described. Numerals 11 and 12 represent liners, which may be paper, plain or creped, water-proofed or otherwise treated. Numeral 13 represents a union between the material 10 and any of the liners, for example, quilting or adhesive, such as asphalt.

The unit 10—11—12 has a certain degree of rigidity and of flexibility. The rigidity of the edges is subject to being increased by splitting the edges lengthwise. For example, the material 10 is cut inwardly to form two layers 15 and 16 of it at the edges. A liner material 17 is used to seal and heal this cut edge. Edge liner 17 is united to the outer side of each liner 11 and 12, and between these points, has a reverse fold 18 therein lining the split in the edge of the insulation. Liner 17 is shown with rectangular portions 19 over the edges of layers 15 and 16. Preferably, liner 17 is adhesively united to the liners 11 and 12 and insulation 10 over its entire area. Thus, each edge of the insulation strip may be opened.

The width of the strip above described is greater than the width of the space between studs 20 and 21 to receive it. The structure is so made that it is sufficiently rigid to sustain itself when placed vertically between studs, with the edges opened as shown to provide a substantially triangular space 22, which incidentally is additionally insulating. This forces the center of the strip to assume a position spaced from the sheathing 23 indicated in dotted lines, and from the inside wall finish 24 shown in dotted lines. Whether or not the structure described may be placed to run in a non-vertical direction, depends upon the specific rigidity and compressibility edgewise.

Fig. 2 represents another form in which two superimposed layers are united in one region and not united along the edges. For convenience, a form is chosen which affords protection for the insulation against moisture vapor from the warm side. The insulation may be a felt as of fibers of wood, mineral, hair or the like, formed on a moisture vapor-transmission-resistant sheet, such as asphalted paper. This may be cut into strips such that the widths of the liner and of the mat or felt are the same. These are preferably superimposed so that the liners will be on the warm side of the corresponding mat. Thus in Fig. 2, the order from cold to warm side is mat 25, liner 26, mat 27 and liner 28. Mat 25 is shown completely sealed in an envelope formed by liner 26 and an additional liner 29. Liner 29 may be a moisture barrier, but being largely on the cold side, it may be pervious to air or moisture or both. Mat 27 may be likewise completely housed in a like envelope before superimposed with its companion 25. It is shown with its cold-side face in part adhesively united to liner 26 by material such as asphalt 30. Asphalt 30 does not extend to the edges, so as to provide for splitting the edge of the composite structure. The non-united portion of the face is covered by strips, one on each side, of liner material 31 which passes over edge 32 and is united to liner 28.

The structure above described is generally the same as that of Fig. 1, and is used in the same way. Being wider than the space it fits, the strip is held by the spreading of its split edges. In Fig. 2, the studs, sheathing and inside finish are represented respectively by the numerals 33, 34 and 35.

The invention is not limited to use of the same general structure on each side of the split. In Figs. 1 and 2, the split at the edge is bounded by two similar insulating layers. Structures may be made involving but one insulating layer. A bowing reinforcement may be used which is continuous over the insulation, or even discontinuous.

For example in Fig. 3 spaced studs 36, have cold-side wall finish 37 and inside wall finish 38. Insulation 39 is shown between studs 36, the insulation being not necessarily wider than the space between the studs 36. The insulation is carried by one or more bowed or bowable members 40 of width greater than the inter-stud space. This may be a sheet of heavy cardboard with sufficient resiliency, or even strips of thin wood or wire or metal strip. The choice of material or form for the bowing structure may depend upon the weight of insulation and the intended location. Such a structure makes an excellent form for insulating inclined roofs. Ordinarily, flexible blanket in such locations sags in the center of the span with edges mounted. Where the insulation 39 is flexible, the edges 41 thereof may be tied to the bowed element 40 by a continuous web or spaced ties represented at 42. The tie is preferably flexible so that the whole structure may be made flat to open.

Fig. 4 represents in perspective a modified form somewhat like that above described, showing an article as it appears in mounted position. A resilient bowing back of corrugated board is shown. This may comprise a corrugated sheet, with lines of corrugation running across the strip (from stud to stud) with one or two plain liners. The corrugated structure is shown at 45. Insulation 46 is shown attached to a face of the corrugated structure 45. The unit may be relatively rigid, where a facing is used in the corrugated sheet, or flexible as for rolling or installing, where a non-faced corrugated sheet is used. The insulation may be likewise flexible or rigid. Where the bowing structure 45 is a moisture barrier, a mat may be carried thereby, without any other liner, or with a moisture pervious liner at the other face. Installation may be made by pushing the unit, bowable liner rearmost, into the receiving space, until the edges of the bowing sheet 45 are within the studs. When lath or plaster base is applied, the insulation will be fixed against removal. Such a mounting is shown in Fig. 5. Studs 47 bear an outer-wall-finish 48, and laths 49. A sheet of double-faced corrugated board 50 is coated on the face (not shown) 51 with asphalt 52 to render it moisture-vapor-transmission resistant. The asphalt is also used to unite any kind of mat or insulation 53 to it, such as a fiber mat of mineral, animal or vegetable substance. Sheet 50 is wider than the inter-stud space in order to cause the structure to bow, when forced between the studs. The sheet 50 also affords some insulation.

There are numerous modifications or improvements which may be added. For example, tooth means may be present to bite into the supports. Such tooth means may or will vary. Thus, in the form of Figs. 4 and 5, the corrugated facing may have teeth permanently mounted in it, or mountable upon it in use.

Figs. 5 and 6 show a metal tooth element 55 with a bridge 56 having teeth 57, and legs 58, which legs may be inserted into the edge of the corrugated board as needed. These are shown in Fig. 4 and Fig. 5, in exaggerated appearance.

The insulation with the split edges may have toothed means as shown in Fig. 7. Angular inserts 60 have one leg of the angle mounted under a facing liner 61, with the other leg lying on the edge 62. Teeth 63 are arranged to point toward the split. Thus, the bowing causes the teeth to bite into the supports to resist closing of the flared edge.

The invention provides insulation which may be shipped to a job, opened from a roll or package, and inserted without the use of a tool. Of course its success is dependent upon standard spacing of studs, or other supports. However, such spacing is carefully maintained in general. Where conditions require narrow spacing, the invention permits cutting down or other simple alteration to preserve the useful features.

It is also to be understood that the invention is not limited to fibrous insulation. However, it affords a most convenient way to adapt fibrous insulation for easy mounting.

I claim:

1. Insulation for insertion between spaced parallel supports comprising a strip of insulation material of width sufficient to extend from support to support, and a resilient bowable facing having a corrugated element thereon, said facing being secured at least to the area of the insulation intermediate the edges and having a width greater than the inter-support space, whereby the facing may be mounted in bowed position between the supports to aid in mounting the insulation between said supports.

2. The structure of claim 1 in which said facing is such as to provide moisture-vapor-transmission resistance, whereby the facing may be located in a wall on the warm side of the insulation.

3. The structure of claim 1 in which said facing is united to the insulation by an adhesive providing moisture-vapor-transmission resistance, whereby the facing may be located in a wall on the warm side of the insulation.

4. Insulation for insertion between spaced parallel supports comprising a strip of insulation having a width greater than a receiving inter-support space, the parallel edges of said strip being split lengthwise of the strip and parallel to the faces of the strip, whereby each split edge may be opened to a flare when inserted, whereby the faces of the insulation are bowed reversely to each other to aid in holding the insulation between supports.

5. Insulation for insertion between spaced parallel supports comprising two superimposed layers of insulation united together at the interface and un-united along an interfacial strip area at each edge, whereby the edges are openable, the width of each layer being greater than an inter-support receiving recess, whereby the edges are flaringly open when the insulation is in said recess, to bow the layers reversely for holding pressure to aid in mounting the insulation.

6. Insulation for automatic mounting by insertion between supports providing spaced parallel surfaces, comprising a strip-like body of insulating material having a width at least equal to the distance between said surfaces, and an imperforate carrier mounting strip therefor of sheet-like form secured to the face of said body, said mounting strip having a width greater than the distance between said surfaces and being suitably rigid whereby it is resiliently bowable to permit insertion between said surfaces to exert edgewise pressure thereon to hold itself in bowed position while carrying said insulation body.

7. Insulation for automatic mounting by insertion between supports providing spaced parallel surfaces, comprising a strip-like body of insulating material having a width at least equal to the distance between said surfaces, an imperforate carrier mounting strip therefor of sheet-like form secured to the face of said body, said mounting strip having a width greater than the distance between said surfaces and being suitably rigid whereby it is resiliently bowable to permit insertion between said surfaces to exert edgewise pressure thereon to hold itself in bowed position while carrying said insulation body, and projecting toothed means associated with the edges of said assembly and carried thereby to bite into said surfaces for holding the bowed strip against removal.

8. Insulation for automatic mounting by insertion between supports providing spaced parallel surfaces, comprising a strip-like body of insulating material having a width at least equal to the distance between said surfaces, and an imperforate carrier mounting strip therefor of sheet-like form secured to the face of said body and unsecured to said face along the edges of said body whereby the edges of the assembly may be split to produce a flare between the laminations, said mounting strip having a width greater than the distance between said surfaces and being suitably rigid whereby it is resiliently bowable to permit insertion between said surfaces to exert edgewise pressure thereon to hold itself in bowed position while carrying said insulation body.

W BARTLETT JONES.